United States Patent [19]

Shiota et al.

[11] Patent Number: 5,488,974
[45] Date of Patent: Feb. 6, 1996

[54] PROCESS FOR MANUFACTURING COMPOSITE FLEXIBLE HOSE

[75] Inventors: Akira Shiota, Takasago; Kazumi Kitani, Hyogo, both of Japan

[73] Assignee: Nichirin Co., Ltd., Kobe, Japan

[21] Appl. No.: 275,410

[22] Filed: Jul. 15, 1994

[30] Foreign Application Priority Data

Aug. 31, 1993 [JP] Japan ..................... 5-215611
Mar. 7, 1994 [JP] Japan ..................... 6-35785

[51] Int. Cl.⁶ ................................. F16L 11/08
[52] U.S. Cl. .................. 138/125; 138/126; 138/137; 138/124; 428/36.2
[58] Field of Search .................. 138/124–127, 138/137, 141, 145, 147, DIG. 3; 428/36.2, 36.3, 36.6–36.9; 156/149

[56] References Cited

U.S. PATENT DOCUMENTS

| | | | |
|---|---|---|---|
| 4,330,017 | 5/1982 | Satoh et al. | 138/126 |
| 4,633,912 | 1/1987 | Pilkington et al. | 138/132 |
| 4,907,625 | 3/1990 | Ito et al. | 138/125 X |
| 4,942,906 | 7/1990 | Igarashi et al. | 138/126 |
| 4,998,564 | 3/1991 | Igarashi et al. | 138/126 |
| 5,084,314 | 1/1992 | Igarashi et al. | 138/125 X |
| 5,264,262 | 11/1993 | Igarashi | 138/125 X |
| 5,349,988 | 9/1994 | Walsh et al. | 138/137 X |
| 5,362,530 | 11/1994 | Kitami et al. | 428/36.2 |
| 5,380,385 | 1/1995 | Derroire et al. | 138/137 X |
| 5,383,087 | 1/1995 | Noone et al. | 138/137 X |

Primary Examiner—David Scherbel
Assistant Examiner—Patrick F. Brinson
Attorney, Agent, or Firm—Varndell Legal Group

[57] ABSTRACT

The present invention relates to a composite flexible hose excellent in pliability without any adhesive layer between an innermost layer and an intermediate rubber layer. The hose consists of the innermost layer, the intermediate rubber layer, a fibrous reinforcement layer and an external rubber layer, each of which is formed in this order from the inside. The innermost layer is formed of a modified polyamide obtainable by blending of a polyamide and a carboxyl-containing modified polyolefin, and the intermediate rubber layer is formed of a rubber composition obtainable by a blend of 10 to 50 parts by weight of silicic acid or a salt thereof and 5 to 15 parts by weight of a brominated alkylphenol formaldehyde resin per 100 parts of the rubber material obtainable by blending butyl rubber and a halogenated butyl rubber at a weight ratio of 50/50 to 0/100. The composite flexible hose is completed by vulcanization after laminating each layer.

5 Claims, 2 Drawing Sheets

PROCESS FOR MANUFACTURING COMPOSITE FLEXIBLE HOSE

BACKGROUND OF THE INVENTION

The present invention relates to a process for manufacturing a composite flexible hose, particularly a composite flexible hose suitable for transporting cooling mediums.

Composite flexible hoses for transporting cooling gases for air conditioners of cars and for contact freezers should be not only flexible but also resistant to an external pressure and an internal pressure of gases transported therethrough. For example, JU-B-40392/1989 discloses a hose for transporting cooling mediums, having four-layer structure; an inner tube comprising a polyamide resin layer and an outer rubber layer, a reinforcement layer provided on the inner tube and an external rubber covering said reinforcement layer. For the polyamide resin layer of the hose, nylon 6, nylon 66, 6/66 copolymer nylon and mixed nylon thereof are used, and for the outer rubber layer, chlorosulfonated polyethylene (CSM), chlorinated polyethylene (CPE), and nitrile butadiene rubber (NBR) are used. Polyamide resin is excellent in heat resistance, fluorine impermeability, refrigerating machine oil (PAG or non-PAG) resistance and moisture impermeability.

For hoses for transporting cooling mediums, there is a case where negative pressure is applied to an inside wall thereof, and therefore adhesion among each layer has to be especially strong. In case of hoses of JU-B-40392/1989, adhesion between the polyamide resin layer and CSM and between CPE and NBR is insufficient, and occasionally negative pressure causes interface adhesive failure.

Figure 4:
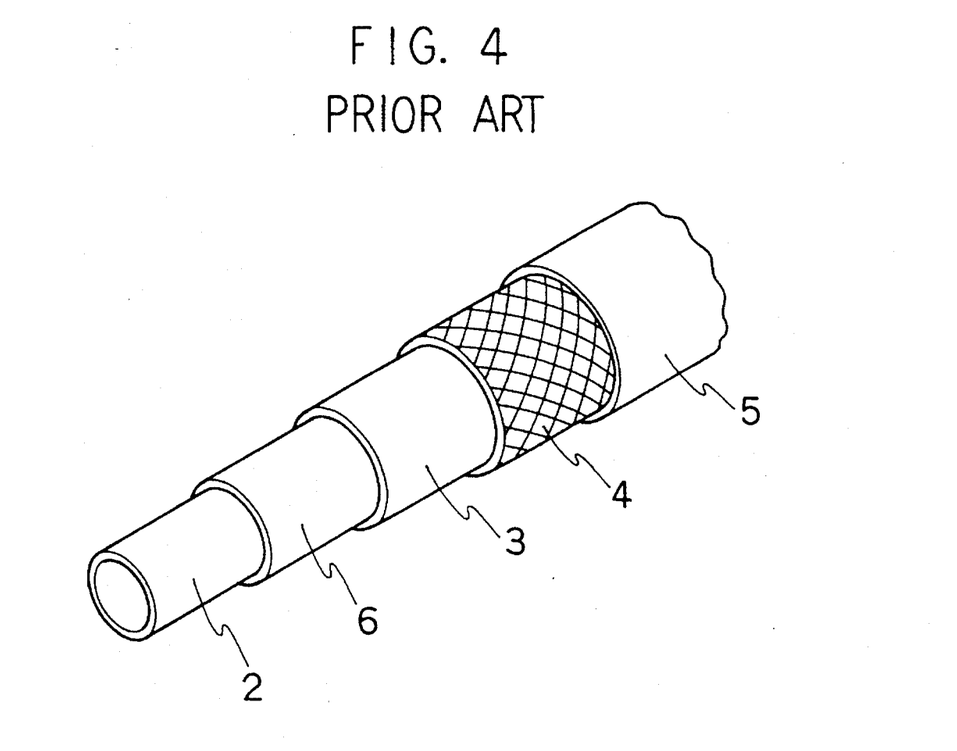
FIG. 4 is a partially cutaway perspective view of a conventional composite flexible hose.

Meanwhile JP-A-110143/1989 discloses a composite flexible hose having a layer structure comprising, as shown in FIG. 4 in the order from the inside, an innermost layer 2, an adhesive layer 6, an intermediate rubber layer 3, a fibrous reinforcement layer 4 and an external rubber layer 5. In these hoses, a polyamide or a modified polyamide is mainly used as material for the innermost layer 2, while a butyl rubber composition is used for the intermediate rubber layer 3 in viewpoints of pliability, cold resistance and moisture impermeability. However, to bond those two layers, the adhesive layer 6 is provided between them, because adhesion of a polyamide to a butyl rubber is generally difficult. As an adhesive for the adhesion layer, mainly used is a solvent type phenol resin, a mixed solvent of a phenol resin and an elastomer, or an epoxy resin adhesive.

However, the use of the solvent type adhesive requires longer time for evaporation of solvent, and more than that, pollutes working environment. Also irrespective of solvent type, the provision of an adhesive layer causes increase in the number of process steps and cost. Therefore, it is originally desirable not to use any adhesive, but the situation is such that an adhesive layer has to be provided in order to obtain a strong adhesion between the layers.

Also U.S. Pat. No. 4,633,912 discloses a composite hose for Freon gas, comprising a polyamide core tube, an elastic friction layer having the specific composition and being directly provided on a core tube, a first reinforcement strand layer, an adhesive barrier friction layer, a second reinforcement strand layer, and then a cover layer. The elastic friction layer provided directly on the core tube comprises (a) a base rubber selected from EPDM, a copolymer of butadiene, polychloroprene, polybutadiene, polyisoprene or a mixture thereof, (b) a calcium ion source, (c) resorcinol or a phenol-based adhesive system, and (d) a peroxide or a sulfuric vulcanizing agent. The calcium source (b) is said to make better adhesion to a polyamide of the core tube. The adhesive barrier friction layer being present between the first and second reinforcement strand layers is provided to minimize a friction of the strands, and is made of a copolymer of ethylene and acrylic acid. For the cover layer, a halogenated butyl rubber containing bis-dienophile as a crosslinking agent is used.

Also various materials for hoses for transporting cooling mediums have been developed. For instance, Tokkyo Kohyo No. 507303/1993 (International Publication No. WO91/18050) discloses a hose composition being excellent in modulus of elasticity, tensile strength and elongation characteristic, and comprising a halogen-containing copolymer of isomonoolefin of $C_4$–$C_7$ and para-alkylstyrene, which contains at least about 5% by weight of the para-alkylstyrene and at least about 0.4% by mole of halogen. The composition further comprises other blending components such as fillers and curing agents like brominated phenol resin. This hose composition is used as at least a part of materials for cooling solution transporting hoses such as an inner tube, a reinforcement material and an external cover. Such a hose is manufactured by extruding the hose composition in the form of tube to make the inner tube, forming the reinforcement layer with a braided fiber on the inner tube, extruding the same hose composition as the inner tube or the conventional material of the external cover onto the reinforcement layer, and then vulcanizing wholly.

Thus, very delicate consideration is required for the combination and selection of materials and layer structure for the inner tube and the rubber layer provided thereon, and the desired effect cannot be obtained only by optional selection of known materials.

For instance, the structure described in U.S. Pat. No. 4,633,912 in which butyl rubber and/or a halogenated butyl rubber having an excellent water impermeability are not used as a material for the intermediate rubber layer, may be provided with no adhesive layer. When butyl rubber and/or a halogenated butyl rubber are used to withstand strict operating conditions, however, an adhesive layer is necessary as described in JP-A-110143/1989.

The rubber composition for the elastic friction layer described in U.S. Pat. No. 4,633,912 and the hose composition described in Tokkyo Kohyo No. 507303/1993 are both inferior in adhesive strength to polyamides, particularly in adhesive strength after heat aging. Especially the former rubber composition has less adhesive strength under normal conditions, and particularly an adhesive strength after heat aging is extremely inferior (Refer to Blend Nos. 1–11 and 1–12 in Table 1).

An object of the present invention is to provide a composite flexible hose having an excellent adhesive strength between layers, even if there is no adhesive layer when butyl rubber is used for the intermediate rubber layer.

Another object of the present invention is to provide a process for manufacturing the composite flexible hose in which a process step for forming an adhesive layer can be eliminated, whereby time and cost can be saved.

SUMMARY OF THE INVENTION

The composite flexible hose of the present invention uses a modified polyamide prepared by blending a polyamide and a carboxyl-containing modified polyolefin as a material for the innermost layer, and as a rubber material for the intermediate rubber layer there is used a rubber composition prepared by blending butyl rubber and a halogenated butyl rubber at a ratio of 50/50 to 0/100 (weight ratio, hereinafter the same). By blending 10 to 50 parts (parts by weight, hereinafter the same) of silicic acid or a salt thereof and 5 to 15 parts of a brominated alkylphenol formaldehyde resin per 100 parts of the rubber material for the intermediate rubber layer, a strong adhesion between the layers can be obtained, even if an adhesive layer is not provided, and the composite flexible hose obtained after vulcanization is enough resistant to negative pressure and indicates an excellent pliability.

This composite flexible hose can be manufactured by a process comprising;

(A) forming an innermost layer by extruding, in a tubular form, a modified polyamide obtainable by blending a polyamide and a carboxyl-containing modified polyolefin, (B) forming an intermediate rubber layer by extruding, directly onto the outer surface of the innermost layer, a rubber composition obtainable by blending 10 to 15 parts of silicic acid or a salt thereof and 5 to 15 parts of a brominated alkylphenol formaldehyde resin per 100 parts of the rubber material obtainable by blending butyl rubber and a halogenated butyl rubber at a weight ratio of 50/50 to 0/100, (C) forming a fibrous reinforcement layer on the outer surface of the intermediate rubber layer without vulcanizing the intermediate layer, (D) forming an external rubber layer on the outer surface of the fibrous reinforcement layer by means of extrusion molding, and (E) vulcanizing the all laminated layers.

Figure 1:
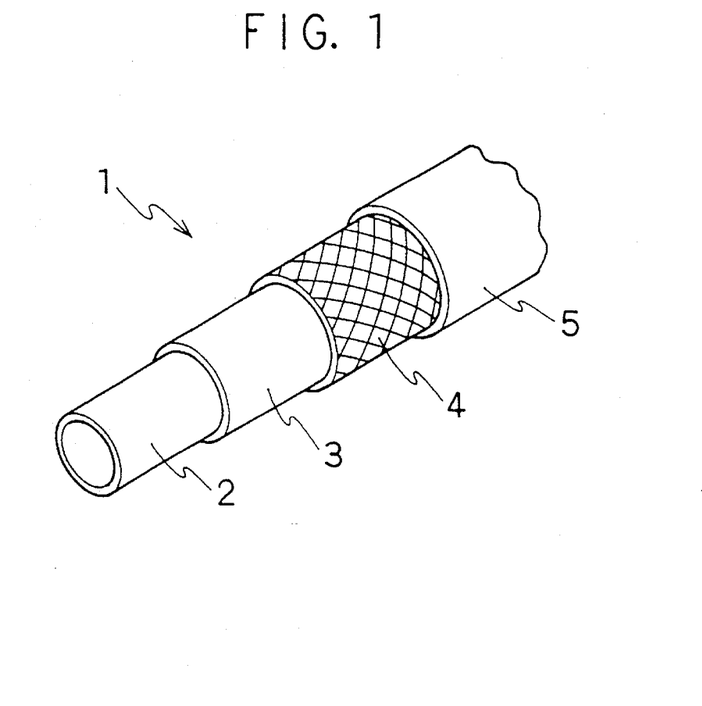
FIG. 1 is a partially cutaway perspective view of an embodiment of the composite flexible hose of the present invention.

That is to say, as described in FIG. 1, the composite flexible hose of the present invention does not have any adhesive layer between the innermost layer 2 and the intermediate rubber layer 3, and, on the intermediate layer, has the fibrous reinforcement layer 4 and then the external rubber layer 5, in this order.

DETAILED DESCRIPTION

According to the present invention, a strong adhesion can be obtained between the innermost layer and the intermediate rubber layer even without an adhesive layer. It is supposed that this is because there occurs complicated reactions among the functional groups of the modified polyamide of the innermost layer such as carboxyl group, amide group and amino group, the halogen atom of the halogenated butyl rubber of the intermediate rubber layer, the reactive silyl group in silicic acid, especially highly reactive silanol group, in silicic acid, and the brominated alkylphenol formaldehyde resin, whereby various chemical bonds are produced.

The innermost layer in the present invention is made of the modified polyamide prepared by blending a polyamide and a carboxyl-containing modified polyolefin. Examples of the polyamide are, for instance, nylon 6, nylon 66, nylon 11, nylon 12, nylon 610, nylon 612, a copolymerized nylon, and a blend thereof. As the carboxyl-containing modified polyolefin, there is preferably used a modified polyolefin prepared by graft-polymerizing a polyolefin which is prepared by homopolymerization or copolymerization of an olefin such as ethylene or propylene and a dienemonomer such as butadiene with an unsaturated carboxylic acid such as acrylic acid, methacrylic acid, maleic acid or fumaric acid and its amide, ester, metal salt or acid anhydride to introduce carboxyl group in an amount of about 0.1 to 10% by mole.

The blending ratio of the polyamide and the modified polyolefin is preferably 90/10 to 50/50, particularly preferably 65/35 to 55/45. When the ratio of the modified polyolefin is larger, though the pliability of the hose is improved, the cooling medium impermeability deteriorates. When smaller, the cooling medium impermeability is improved, the pliability and the adhesion to the intermediate rubber layer tend to deteriorate.

Examples of the modified polyamide are, for instance, UTN series such as UTN 141 and UTN 121 of Toray Industries, Inc., which are a blend of nylon 6 and a carboxyl-containing modified polyolefin; ZYTEL ST series such as ZYTEL ST801, ZYTEL ST811 and ZYTEL ST811HS of E. I. du Pont, which are supposed to be a blend of nylon 6 and a carboxyl-containing modified polyolefin; and the like.

The innermost layer is formed by extruding the modified polyamide in a tubular form, and a thickness thereof is preferably not less than 0.05 mm in view of molding workability and cooling medium impermeability, and is preferably not more than 0.5 mm in view of pliability.

In the present invention, the intermediate rubber layer is formed directly on the innermost layer. Therefore, a process step for forming an adhesive layer can be eliminated, which results in that a period of time for evaporating a solvent can be saved and that a total number of process steps can be decreased The intermediate rubber layer can be formed by extruding the rubber composition directly on the outer surface of the innermost layer. Such a rubber composition is prepared by blending silicic acid or a salt thereof and a brominated alkylphenol formaldehyde resin with the rubber material, i.e. a rubber mixture of butyl rubber and a halogenated butyl rubber at a mixing rate of 50/50 to 0/100.

As the halogenated butyl rubber blended with butyl rubber, there are employed, for example, one or more of a chlorinated butyl rubber, a brominated butyl rubber and the like, and particularly the single use of the brominated butyl rubber is preferable in view of reactivity. If a blending amount of the halogenated butyl rubber is less than 50% (% by weight, hereinafter the same), the reactivity to the modified polyamide of the innermost layer becomes particularly low, and the adhesive strength is lowered.

According to the present invention, with 100 parts of the rubber material is blended silic acid or a salt thereof in an amount of 10 to 50 parts, preferably 15 to 30 parts, particularly preferably 20 to 30 parts, and the brominated alkylphenol formaldehyde resin in an amount of 5 to 15 parts, preferably 7 to 13 parts, particularly preferably 8 to 10 parts.

As silicic acid or a salt thereof, there are employed, for example, silic acid anhydride, silicic acid hydrate, hydrate calucium silicate, hydrate aluminium silicate, and the like. Especially from viewpoint of good adhesion to the halogenated butyl rubber, silicic acid hydrate having a large amount of silanol group is preferable. These are in the form of white superfine powder (primary particle size of 10 to 60 μm), so called white carbon, and are usually used as reinforcing fillers for rubbers. They are very highly reactive, and form hydrogen bond with the modified polyamide, the halogenated butyl rubber and the brominated alkylphenol formaldehyde resin. When the content is less than 10 parts, adhesion deteriorates, and when more than 50 parts, viscosity becomes high, which causes rough surface condition after extrusion. Examples of the brominated alkylphenol formaldehyde resin are Tackirol 250-1, Tackirol 250-3, Tackirol 201 commercially available from Taoka Chemical Co., Ltd, and the like. Among them, Tackirol 250-1 is preferable because no catalyst is required. This has a role of a crosslinking agent for butyl rubber, and since it has hydroxyl group, it forms hydrogen bond with the modified polyamide to strengthen adhesion. When the content is less than 5 parts, a rate of crosslinking with the rubber material becomes slow at the time of vulcanization to deteriorate its physical properties. Contrarily when more than 15 parts, the resulting rubber composition becomes tacky to adhere to a roll at the time of kneading and extruding, and is early vulcanized, which results in bad workability.

In order to further enhance an adhesive strength with the innermost layer, a dialkylaminoethyl methacrylate can be blended with the rubber composition for the intermediate rubber layer. It is supposed that this component can increase an amount of polar group in the rubber composition for the intermediate rubber layer to increase the reaction with amide group, amino group and carboxyl group in the modified polyamide of the innermost layer, and thus an adhesive strength becomes strong. Examples of such a component are, for instance, dimethylaminoethyl methacrylate, diethylaminoethyl methacrylate, a quaternary compound of dimethylaminoethyl methacrylate, and the like. The preferable blending ratio is 0.3 to 3.0 parts, particularly 0.5 to 2 parts per 100 parts of the rubber material. When less than 0.3 parts, the effect of the blend cannot be obtained, and when more than 3.0 parts, a scorching time of the rubber composition is shortened to deteriorate physical properties and adhesive strength of the resulting rubber.

With the rubber composition for the intermediate rubber layer, there can be additionally blended carbon black, zinc white, stearic acid, phosphoric acid, a plasticizer, an antioxidant, a processing aid and the like in a proper amount.

The intermediate rubber layer is formed by extruding so as to have a thickness of usually 0.8 to 2.2 ram, preferably 1.0 to 1.5 min.

After extrusion molding of the intermediate rubber layer, a braided or spirally wrapped fibrous reinforcement layer and then an external rubber layer are provided on the intermediate rubber layer. For the fibrous reinforcement layer and the external layer, any conventional materials can be used as they are. For the fibrous reinforcement layer, there can be used, for instance, natural fibers and synthetic fibers such as poly(vinyl alcohols), polyamides, polyesters and aramides alone or in admixtures thereof, or after subjecting to the known RFL (resorcinol-formaldehyde-latex adhesives) treatment. For the external rubber layer, there can be used, for instance, synthetic rubbers such as EPDM, CR, CSM, IIR and XIIR which are excellent in ozone resistance. A thickness of the external rubber layer is usually about 1.0 to 2.0 mm.

The composite flexible hose of the present invention is obtainable by, on the innermost layer, forming the intermediate rubber layer, the fibrous reinforcement layer and the external rubber layer, and then entirely vulcanizing. The vulcanization is preferably carried out under the conditions of a steam pressure of 4 to 5.5 kgf/cm$^2$ and a temperature of about 150° to 160° C.

The composite flexible hose of the present invention, which is obtained after the vulcanization, has an enough pliability and is free from interface adhesive failure, even if there occurs a negative pressure.

The present invention is more specifically described and explained by means of the following Examples. It is to be understood that the present invention is not limited to those Examples, and may be made various changes and modifications without departing from the scope or spirit of the present invention.

The properties shown in each Example are measured in the following manners.
Test for materials of intermediate rubber layer
(Curast)

Only the minimum torque value ($V_m$) is measured at 160° C. by the use of JSR Curast meter (IIF type of Japan Synthetic Rubber Co., Ltd.; sensitivity: ½ kg, deflection angle: 3°, chart speed: 300 mm/hr., die: # type).
(Tension test under normal conditions)

Hardness, tensile strength and elongation at break are measured in accordance with the testing method of JIS (Japan Industrial Standards) K 6251 (press vulcanization at 160° C. for 40 minutes; dumbbell No. 3).
(Compression set test)

This test is conducted in accordance with JIS K 6262 (press vulcanization at 160° C. for 40 minutes, compression by 25%, 140° ±2° C.×72 hours).
(Surface conditions of intermediate rubber layer)

Rubber composition is extruded onto the innermost tube having an outer diameter of 11.9 mm at a rate of 12 m/minute (75 mmφ cold weed type extruder; nipple temperature: 130° C., die temperature: 100° C., cylinder temperature: 80° C., screw temperature: 60° C., screw rotation speed: 30 rpm), and the surface (skin) conditions are observed with naked eyes.

A: Flat surface
B: Slightly lined surface
C: Lined surface
D: Goose-skin surface
(Mooney scorch test)

To be measured in accordance with JIS K 6300-5.
Test for adhesion between the innermost layer and the intermediate layer
(T type peeling test)

Figure 2:
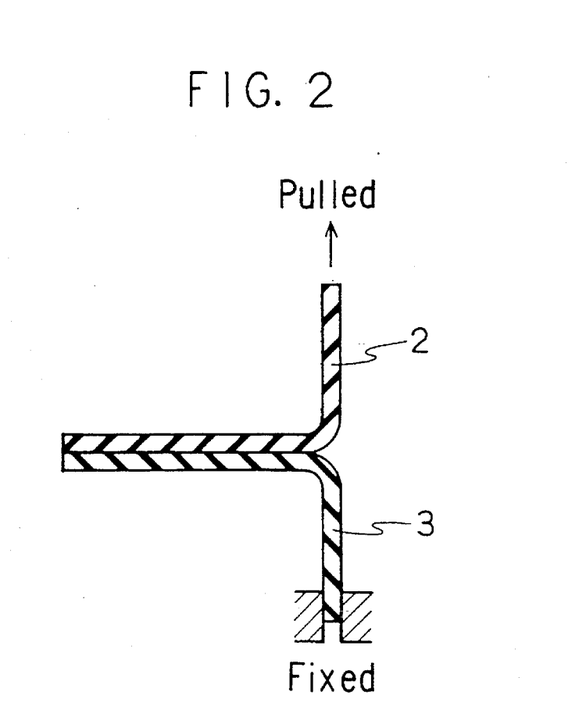
FIG. 2 is a diagrammatic illustration for an adhesion test of the intermediate rubber layer.

Resin for the innermost layer is cut to a size of 0.15 mm thick, about 30 mm wide and about 100 mm long, and nonvulcanized rubber sheet (2.3 mm thick and 200 mm square) for the intermediate rubber is put thereon, and then press-vulcanized at 160° C. for 40 minutes. After allowing to stand at room temperature for one day, a test piece having a size of about 10 mm wide and about 100 mm long is cut out therefrom. This test piece is set on a tension tester (JIS B 7721) with the intermediate rubber layer side being fixed. Then the innermost layer side is pulled at a speed of 50 mm/minute as shown in FIG. 2, and a load at the time of separation is measured.

An adhesive strength after heat aging is measured after heating at 150° C. for 168 hours.
Hose performance
(Adhesive strength)

A test piece having a size of about 10 mm wide and about 100 mm long is cut out from the obtained composite flexible hose, and then the external rubber layer and the fibrous reinforcement layer are removed. The same adhesion test as above is conducted by the use of the test piece. An adhesive strength is represented in kg/in converted from an adhesive strength (kg/10 mm) of 10 mm wide.

(Pliability test)

Figure 3:
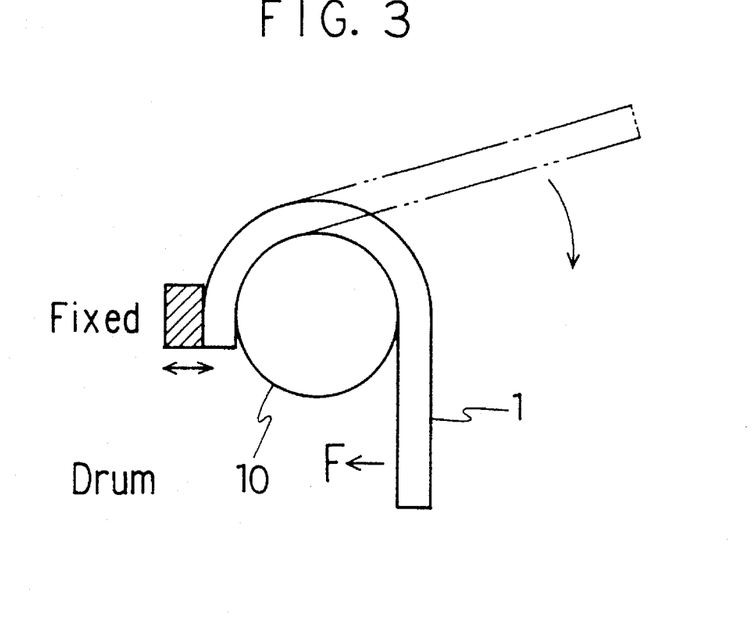
FIG. 3 is a diagrammatic illustration for a pliability test of the composite flexible hose.

As shown in FIG. 3, the hose is fixed at one end and is wound over a 190 mm diameter drum 10 so as to be U shape (angle: 180°). A force (F) which is necessary to maintain the above state is measured.

(Cooling medium permeation test)

To be measured in accordance with SAE J 51 MAY85 (AUTOMOTIVE AIR CONDITIONING HOSE) (Cooling medium R134a, 90° C.).

(Repeated compression test after heat aging)

Gas in the hose is substituted by nitrogen gas and the hose is sealed with blank caps. The hose is allowed to stand in a constant temperature tank of 140° C. for 168 hours, and thereafter is allowed to stand for one day at room temperature. Then the cycle of elevating an internal pressure of the hose from 0 to 54 kg/cm² by a hydraulic pressure is repeated 35 times per minute, and the number of cycles when the oil inside the hose leaks out through the ASSY (assembled) parts or the outer surface is measured (ambient temperature: 100° C., oil temperature: 100° C.)

EXAMPLE 1

The following additives were blended with the rubber material shown in Table 1 and then kneaded to prepare a rubber composition (green rubber material) for the intermediate rubber layer.

|  | (Parts by weight) |
|---|---|
| Rubber material (shown in Table 1) | 100 |
| HAF carbon | 30 |
| (Siest 300 of Tokai Carbon Co., Ltd.) | |
| SRF carbon | 30 |
| (Siest S of Tokai Carbon Co., Ltd.) | |
| Silicic acid hydrate | 20 |
| (Hi-Sil 233 of PPG Industries, Ltd.) | |
| Zinc oxide No. 3 (Seido Chemical Industry Co., Ltd.) | 5 |
| Stearic acid (Sin-nihon Rika Co., Ltd.) | 1 |
| Antioxidant | 1 |
| (Antage OD of Kawaguchi Chemical Industry Co., Ltd.) | |
| Plasticizer | 2 |
| (Sunpar 2280 of Japan Sun Oil Co., Ltd.) | |
| Brominated Alkylphenol formaldehyde resin | 10 |
| (Tackirol 250-1 of Taoka Chemical Co., Ltd.) | |

The characteristics of the obtained green rubber material (curast, hardness at normal conditions, tensile strength, elongation at break arid permanent compression stress) were determined. The results are shown in Table 1.

As a resin for the innermost layer, Zytel ST811HS (innermost layer A) and AMILAN® UTN 141 (innermost layer B) were used to determine an adhesive strength between the intermediate rubber layer and the innermost layer. The results are shown in Table 1.

In the Blend No. 1–11 in Table 1, there is used the rubber composition of the Composition F in Table 1 of Tokkyo Kohyo No. 507303/1993 as it is for the intermediate rubber layer. In the Blend No. 1–12, there is used the elastomer layer composition described in Example 1 of U.S. Pat. No. 4,633,912 as it is for the intermediate rubber layer, and then the rubber composition is vulcanized with a peroxide as a vulcanizing agent.

TABLE 1

| | | | Blend No. | | | | | | | | | | | |
|---|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-11 | 1-12 |
| Rubber blend (parts) | | Brominated butyl rubber | 100 | — | 75 | 50 | 25 | — | — | — | — | — | — | — |
| | | Chlorinated butyl rubber | — | 100 | — | — | — | 25 | — | — | — | — | — | — |
| | | Regular butyl rubber | — | — | 25 | 50 | 75 | 75 | 100 | — | — | — | — | — |
| | | CSM | — | — | — | — | — | — | — | 100 | — | — | — | — |
| | | CPE | — | — | — | — | — | — | — | — | 100 | — | — | — |
| | | NBR | — | — | — | — | — | — | — | — | — | 100 | — | — |
| | | Rubber of Tokkyo Kohyo No. 507303/1993 | — | — | — | — | — | — | — | — | — | — | 100 | — |
| | | Intermediate rubber in Ex. 1 of U.S. Pat. No. 4,633,912 | — | — | — | — | — | — | — | — | — | — | — | 100 |
| Characteristics | Intermediate rubber composition | Curast (Vm) | 7.0 | 7.0 | 6.0 | 6.0 | 6.0 | 5.5 | 5.0 | 5.5 | 6.0 | 5.2 | 4.0 | 8.0 |
| | | Hardness | 74 | 75 | 74 | 73 | 68 | 67 | 65 | 70 | 75 | 76 | 59 | 90 |
| | | Tensile strength (kgf/cm²) | 142 | 151 | 150 | 149 | 148 | 136 | 138 | 188 | 135 | 181 | 106 | 27 |
| | | Elongation at break (%) | 250 | 260 | 290 | 370 | 500 | 490 | 600 | 270 | 290 | 310 | 740 | 50 |
| | | Permanent compression stress (%) | 52.9 | 51.1 | 54.7 | 62.7 | 76.0 | 78.1 | 81.6 | 72 | 78 | 58 | 90 | 99 |
| | | Extrusion | B | B | B | B | B | B | B | B | B | B | B | C |
| | | Surface condition | B | B | B | B | B | B | B | B | C | B | B | C |
| | Adhesive strength of rubber layer (kgf/in) | Normal condition | | | | | | | | | | | | |
| | | Innermost layer A | 16.8 | 16.3 | 13.2 | 12.9 | 10.3 | 9.5 | 6.5 | 6.9 | 6.5 | 11.5 | 4.5 | 3.5 |
| | | Innermost layer B | 17.0 | 16.8 | 11.8 | 11.3 | 9.5 | 9.0 | 5.9 | 6.5 | 6.3 | 12.0 | 5.5 | 4.9 |
| | | After heat aging | | | | | | | | | | | | |
| | | Innermost layer A | 5.9 | 9.6 | 6.6 | 5.3 | 2.0 | 1.8 | 1.5 | 1.5 | 1.0 | 1.8 | <0.5 | <0.5 |
| | | Innermost layer B | 4.7 | 6.6 | 4.2 | 3.8 | 1.3 | 1.1 | 1.2 | 1.2 | 1.0 | 2.1 | <0.5 | <0.5 |

CSM: Chlorosulfonated polyethylene
CPE: Chlorinated polyethylene
NBR: Nitrile butadiene rubber TABLE 1-continued

|  | Blend No. | | | | | | | | | | | |
|---|---|---|---|---|---|---|---|---|---|---|---|---|
|  | 1-1 | 1-2 | 1-3 | 1-4 | 1-5 | 1-6 | 1-7 | 1-8 | 1-9 | 1-10 | 1-11 | 1-12 |

Innermost layer A: Zytel ST811HS
Innermost layer B: UTN141

EXAMPLE 2

A rubber composition (green rubber material) having the following formulation was prepared in order to examine an influence of silicic acid (silicic acid hydrate) in the intermediate rubber layer.

|  | (Parts by weight) |
|---|---|
| Brominated butyl rubber | 100 |
| HAF carbon (Siest 300) | Refer to Table 2 |
| Silicic acid hydrate (Hi-Sil 233) | Refer to Table 2 |
| Zinc oxide No. 3 | 5 |
| Stearic acid | 1 |
| Antioxidant (Antage OD) | 1 |
| Plasticizer (Sunpar 2280) | 6 |
| Brominated alkylphenol formaldehyde resin (Tackirol 250-1) | 10 |

The characteristics of the obtained green rubber material and an adhesive strength to the innermost layer were determined in the same manner as in Example 1. The results are shown in Table 2.

in the intermediate rubber layer.

|  | (Parts by weight) |
|---|---|
| Brominated butyl rubber | 100 |
| HAF carbon (Siest 300) | 70 |
| Silicic acid hydrate (Hi-Sil 233) | 10 |
| Zinc oxide No. 3 | 5 |
| Stearic acid | 1 |
| Antioxidant (Antage OD) | 1 |
| Plasticizer (Sunpar 2280) | 6 |
| Brominated alkylphenol formaldehyde resin (Tackirol 250-1) | Refer to Table 3 |

The characteristics of the green rubber material and an adhesive strength to the innermost layer were determined in the same manner as in Example 1. The results are shown in Table 3.

TABLE 2

|  |  |  | Blend No. | | | | | | |
|---|---|---|---|---|---|---|---|---|---|
|  |  |  | 2-1 | 2-2 | 2-3 | 2-4 | 2-5 | 2-6 | 2-7 |
| Blend (parts) | Silicic acid hydrate | | 0 | 5 | 10 | 30 | 50 | 70 | 80 |
|  | HAF carbon | | 80 | 75 | 70 | 50 | 30 | 10 | 0 |
| Characteristics | Intermediate rubber composition | Curast (Vm) | 4.2 | 4.2 | 4.5 | 6.0 | 10.8 | 23.5 | 33.5 |
|  |  | Hardness | 80 | 78 | 78 | 80 | 83 | 87 | 94 |
|  |  | Tensile strength (kgf/cm$^2$) | 142 | 138 | 139 | 145 | 136 | 134 | 133 |
|  |  | Elongation at break (%) | 210 | 220 | 230 | 320 | 470 | 560 | 580 |
|  |  | Permanent compression stress (%) | 46.5 | 46.8 | 53.7 | 65.4 | 70.3 | 86.5 | 90.1 |
|  |  | Extrusion | A | A | A | B | C | C | D |
|  |  | Surface condition | A | B | B | B | C | C | D |
|  | Adhesive strength of rubber layer (kgf/in) | Normal condition | | | | | | | |
|  |  | Innermost layer A | 7.2 | 8.4 | 11.2 | 16.7 | 17.7 | 18.4 | 19.4 |
|  |  | Innermost layer B | 6.6 | 5.1 | 10.4 | 17.3 | 20.1 | 20.7 | 20.1 |
|  |  | After heat aging | | | | | | | |
|  |  | Innermost layer A | 1.5 | 1.9 | 4.9 | 10.9 | 12.0 | 9.5 | 9.5 |
|  |  | Innermost layer B | 1.3 | 1.7 | 4.7 | 11.4 | 12.2 | 9.4 | 10.0 |

EXAMPLE 3

A rubber composition (green rubber material) having the following formulation was prepared in order to examine an influence of the brominated alkylphenol formaldehyde resin

TABLE 3

|  |  | Blend No. | | | | |
|---|---|---|---|---|---|---|
|  |  | 3-1 | 3-2 | 3-3 | 3-4 | 3-5 |
| Blend (parts) | Brominated | 3 | 5 | 10 | 15 | 30 |

TABLE 3-continued

|  |  |  | Blend No. | | | | |
|---|---|---|---|---|---|---|---|
|  |  |  | 3-1 | 3-2 | 3-3 | 3-4 | 3-5 |
| Characteristics | alkylphenol aldehyde resin Intermediate rubber composition | Curast (Vm) | 5.5 | 5.5 | 4.2 | 4.5 | 4.0 |
|  |  | Hardness | 76 | 77 | 78 | 80 | 80 |
|  |  | Tensile strength (kgf/cm$^2$) | 139 | 143 | 139 | 139 | 133 |
|  |  | Elongation at break (%) | 310 | 250 | 230 | 210 | 300 |
|  |  | Permanent compression stress (%) | 58.9 | 57.5 | 53.7 | 50.8 | 60.3 |
|  |  | Extrusion | A | A | A | A | C |
|  |  | Surface condition | B | B | B | B | B |
|  | Adhesive strength of rubber layer (kgf/in) | Normal condition | | | | | |
|  |  | Innermost layer A | 5.3 | 10.2 | 11.2 | 12.5 | 13.5 |
|  |  | Innermost layer B | 5.1 | 9.8 | 10.4 | 10.9 | 12.9 |
|  |  | After heat aging | | | | | |
|  |  | Innermost layer A | 2.0 | 4.1 | 4.9 | 5.6 | 5.8 |
|  |  | Innermost layer B | 2.4 | 4.0 | 4.7 | 4.9 | 5.3 |

EXAMPLE 4

A rubber composition (green rubber material) having the following formulation was prepared in order to examine an effect of addition of the dialkylaminoethyl methacrylate in the intermediate rubber layer.

|  | (Parts by weight) |
|---|---|
| Brominated butyl rubber | 100 |
| HAF carbon (Siest 300) | 38 |
| SRF carbon (Siest S) | 21 |
| Silicic acid hydrate (Hi-Sil 233) | 19 |
| Zinc oxide No. 3 | 5 |
| Stearic acid | 1 |

-continued

|  | (Parts by weight) |
|---|---|
| Antioxidant (Antage OD) | 1.5 |
| Processing aid (Stractol W8222 from Shell & Seilaher) | 1.5 |
| Plasticizer (Sunpar 2280) | 6 |
| Brominated alkylphenol formaldehyde resin (Tackirol 250-1) | 8 |
| Dimethylaminoethyl methacrylate (Light ester DE of Kyoeisha Yushi Kagaku Kogyo Kabushiki Kaisha) | Refer to Table 4 |

The characteristics of the green rubber material and an adhesive to the innermost layer were examined in the same manner as in Example 1. The results are shown in Table 4.

TABLE 4

|  |  |  | Blend No. | | | | |
|---|---|---|---|---|---|---|---|
|  |  |  | 4-1 | 4-2 | 4-3 | 4-4 | 4-5 |
| Blend (parts) | Dimethylaminoethyl methacrylate | | 0 | 0.2 | 0.5 | 1.0 | 1.5 |
| Characteristics | Intermediate rubber composition | Scorch test (Vm) | 66.0 | 65.2 | 58.5 | 56.7 | 56.5 |
|  |  | Hardness | 75 | 75 | 74 | 74 | 73 |
|  |  | Tensile strength (kgf/cm$^2$) | 128 | 126 | 136 | 136 | 134 |
|  |  | Elongation at break (%) | 270 | 280 | 300 | 330 | 370 |
|  |  | Permanent compression set (%) | 61.3 | 62.9 | 63.0 | 64.2 | 66.9 |
|  |  | Extrusion | B | B | B | B | B |
|  |  | Surface condition | B | B | B | B | B |
|  | Adhesive strength of rubber layer (kgf/in) | Normal condition | | | | | |
|  |  | Innermost layer A | 12.5 | 12.5 | 15.6 | 18.2 | 16.2 |
|  |  | Innermost layer B | 13.5 | 13.6 | 14.9 | 19.2 | 13.8 |
|  |  | After heat aging | | | | | |
|  |  | Innermost layer A | 5.5 | 5.8 | 5.9 | 6.0 | 6.2 |
|  |  | Innermost layer B | 5.4 | 5.6 | 5.8 | 6.0 | 6.0 |

EXAMPLE 5

A composite flexible hose was made by the use of the rubber composition for the intermediate rubber layer which was prepared in Examples 1 to 4, in the manner as described hereinbelow. The characteristics of the hose were examined.
(Manufacture of composite flexible hose)

Modified polyamide for the innermost layer is extruded on a mandrel (outside diameter of 1.75 mm) made of resin at a rate of 12 m/minute so as to form an innermost layer of 0.15 mm thick, and about 30 minutes later, a rubber composition for the intermediate rubber layer is extruded on the innermost layer at a rate of 12 m/minute so as to form an intermediate rubber layer of 1.3 mm thick. Subsequently a RFL-treated polyethylene terephthalate yarn is braided to form a fibrous reinforcement layer, and finally EPDM is extruded to form an external rubber layer of 1.5 mm thick. The obtained nonvulcanized hose is heated for vulcanization at 160° C. for 40 minutes to make a composite flexible hose.

Also a composite flexible hose having a conventional adhesive layer was made in the manner mentioned hereinbelow to examine the characteristics of the conventional hose. The results are shown in Table 5.
(Manufacture of conventional composite flexible hose)

Modified polyamide (Zytel ST811HS) for the innermost layer is extruded in the same manner as above to form an innermost layer. About 30 minutes later, an adhesive (Specific chlorine rubber adhesive; Chemrock 238) is applied onto the innermost layer by dip coating. Then after about one minute drying at 100° to 150° C., an intermediate rubber composition of a chlorinated butyl rubber which does not contain silicic acid hydrate but contains a brominated alkylphenol formaldehyde resin is extruded at a rate of 10 m/minute so as to form an intermediate rubber layer of 1.3 mm thick. Then a fibrous reinforcement layer and an external rubber layer are formed in the same manner as above to make a comparative composite flexible hose.

TABLE 5

| Blend No. for intermediate rubber layer | Adhesive strength (kgf/cm) | Pliability | Cooling medium permeability (g/m/72 hr) | Repeated compression characteristic (× 10,000 times) |
|---|---|---|---|---|
| 1-1 | >5 | O | 2.0 | >10 |
| 1-2 | >5 | O | 2.1 | >10 |
| 1-4 | 5.0 | O | 2.2 | >10 |
| 1-5 | 4.1 | O | 2.3 | Leak at 6.5 |
| 1-7 | 3.7 | O | 2.3 | Leak at 5.1 |
| 2-2 | 3.3 | O | 2.0 | Leak at 3.5 |
| 2-5 | >5 | O | 1.9 | >10 |
| 3-1 | 2.1 | O | 2.6 | Leak at 9.3 |
| 3-2 | 4.1 | O | 2.0 | >10 |
| 3-3 | 4.4 | O | 1.8 | >10 |
| 3-5 | 4.0 | O | Not tested | Not tested |
| 4-2 | >5 | O | 2.2 | >10 |
| 4-4 | >5 | O | 2.1 | >10 |
| Conventional hose | 4.2 | O | 1.9 | >10 |

According to the present invention, the innermost layer and the intermediate rubber layer can be brought into contact with each other without any adhesive layer, thereby eliminating a process step for forming an adhesive layer. A composite flexible hose is excellent particularly in adhesive strength and pliability after heat aging.

What we claim is:

1. A composite flexible hose consisting of an innermost layer, an intermediate rubber layer, a fibrous reinforcement layer and an external rubber layer in this order from the inside; wherein the innermost layer comprises a modified polyamide obtainable by a blend of a polyamide and a carboxyl-containing modified polyolefin; and the intermediate rubber layer comprises a rubber composition obtainable by a blend of a rubber material, 10 to 50 parts by weight of one of silicic add and a salt thereof and 5 to 15 parts by weight of a brominated alkylphenol formaldehyde resin per 100 parts by weight of the rubber material; where the rubber material is obtainable by a blend of butyl rubber and a halogenated butyl rubber at a weight ratio of 50/50 to 0/100; and said hose is obtainable by vulcanizing after the formation of all the layers, and has no adhesive layer between the innermost layer and the intermediate rubber layer.

2. The composite flexible hose of claim 1, wherein the polyamide in said modified polyamide is a member selected from the group consisting of nylon 6, nylon 66, nylon 11, nylon 12 and a mixture of two or more thereof.

3. The composite flexible hose of claim 1, wherein said intermediate rubber layer contains 0.3 to 3.0 parts by weight of dialkylaminoethyl methacrylate per 100 parts by weight of the rubber material.

4. A process for manufacturing a composite flexible hose comprising;
   (A) forming an innermost layer by extruding, in a tubular form, a modified polyamide obtainable by a blend of a polyamide and a carboxyl-containing modified polyolefin,
   (B) forming an intermediate rubber layer by extruding, directly onto an outer surface of the innermost layer, a rubber composition obtainable by a blend of a rubber material, 10 to 50 parts by weight of one of silicic acid and a salt thereof and 5 to 15 parts by weight of a brominated alkylphenol formaldehyde resin per 100 parts by weight of the rubber material, the rubber material is obtainable by a blend of butyl rubber and a halogenated butyl rubber at a weight ratio of 50/50 to 0/100,
   (C) forming a fibrous reinforcement layer on an outer surface of the intermediate layer without vulcanizing the intermediate layer,
   (D) forming an external rubber layer on the fibrous reinforcement layer by means of extrusion molding, and
   (E) vulcanizing all laminated layers, provided that there is no adhesive layer between the innermost layer and the intermediate layer.

5. A composite flexible hose consisting essentially of an innermost layer, an intermediate rubber layer on the innermost layer, a fibrous reinforcement layer on the intermediate layer and an external rubber layer on the fibrous reinforcement layer; the innermost layer comprising a modified polyamide obtained by blending a polyamide and a carboxyl-containing modified polyolefin; the intermediate rubber layer comprising a rubber composition obtained by blending a rubber material, 10 to 50 parts by weight of one of silicic acid and a salt thereof and 5 to 15 parts by weight of a brominated alkylphenol formaldehyde resin per 100 parts by weight of the rubber material; and the rubber material is obtained by blending butyl rubber and a halogenated butyl rubber at a weight ratio of 50/50 to 0/100; and the hose is obtained by vulcanizing after formation of the innermost, intermediate and external layers, and has no adhesive layer between the innermost layer and the intermediate rubber layer.

* * * * *